(12) United States Patent
Xiao et al.

(10) Patent No.: US 9,844,831 B2
(45) Date of Patent: Dec. 19, 2017

(54) RESISTANCE SPOT WELDING SYSTEM AND METHOD

(71) Applicant: GM GLOBAL TECHNOLOGY OPERATIONS LLC, Detroit, MI (US)

(72) Inventors: Guoxian Xiao, Troy, MI (US); Pei-Chung Wang, Troy, MI (US); Jorge F. Arinez, Rochester Hills, MI (US); Joseph Clifford Simmer, Richmond, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 374 days.

(21) Appl. No.: 14/690,894

(22) Filed: Apr. 20, 2015

(65) Prior Publication Data

US 2015/0306862 A1   Oct. 29, 2015

Related U.S. Application Data

(60) Provisional application No. 61/983,656, filed on Apr. 24, 2014.

(51) Int. Cl.
*B23K 11/30* (2006.01)
*B23K 11/02* (2006.01)
(Continued)

(52) U.S. Cl.
CPC ............. *B23K 11/30* (2013.01); *B23K 11/02* (2013.01); *B23K 11/16* (2013.01); *B23K 11/20* (2013.01);
(Continued)

(58) Field of Classification Search
CPC ......... B23K 11/30; B23K 11/02; B23K 11/16; B23K 11/20; B23K 11/3009;
(Continued)

(56) References Cited

U.S. PATENT DOCUMENTS 4,602,148 A * 7/1986 Ramsey ................ B29C 65/342
156/272.2
2007/0272660 A1* 11/2007 Wang .................. B23K 11/0053
219/93

(Continued)

FOREIGN PATENT DOCUMENTS

CN         101543933 A      9/2009

*Primary Examiner* — Daniel McNally
(74) *Attorney, Agent, or Firm* — Quinn IP Law

(57) ABSTRACT

A resistance spot welding system can join two polymeric workpieces and includes a power supply. The power supply has a positive terminal and a negative terminal. The resistance spot welding system further includes a welding electrode assembly electrically connected to the power supply. The welding electrode assembly includes a housing, a first electrically conductive pin and a second electrically conductive pin. The first and second electrically conductive pins both protrude from the housing. The first electrically conductive pin is electrically connected to the positive terminal of the power supply, and the second electrically conductive pin is electrically connected to the negative terminal of the power supply. The second electrically conductive material is electrically insulated from the first electrically conductive pin. The first and second electrically conductive pins are at least partly made of a material having a hardness ranging between 50 HRC and 70 HRC.

8 Claims, 2 Drawing Sheets

(51) Int. Cl.
  B23K 11/16 (2006.01)
  B23K 11/20 (2006.01)
  B29C 65/34 (2006.01)
  B29C 65/00 (2006.01)
  B23K 101/34 (2006.01)
  B23K 103/04 (2006.01)
  B23K 103/10 (2006.01)
  B23K 103/14 (2006.01)
  B23K 103/18 (2006.01)
  B23K 103/00 (2006.01)
  B29C 65/48 (2006.01)

(52) U.S. Cl.
  CPC ........ B23K 11/3009 (2013.01); B29C 65/346 (2013.01); B29C 65/3468 (2013.01); B29C 66/1122 (2013.01); B29C 66/41 (2013.01); B29C 66/73921 (2013.01); *B23K 2201/34* (2013.01); *B23K 2203/04* (2013.01); *B23K 2203/10* (2013.01); *B23K 2203/14* (2013.01); *B23K 2203/18* (2013.01); *B23K 2203/42* (2015.10); *B29C 65/3476* (2013.01); *B29C 65/3488* (2013.01); *B29C 65/3492* (2013.01); *B29C 65/4815* (2013.01); *B29C 65/4855* (2013.01); *B29C 66/71* (2013.01); *B29C 66/721* (2013.01)

(58) Field of Classification Search
  CPC .............. B29C 65/346; B29C 65/3468; B29C 66/1122; B29C 66/41; B29C 66/73921
  See application file for complete search history.

(56) References Cited

U.S. PATENT DOCUMENTS

2008/0087650 A1* 4/2008 Wang ................... B23K 11/002
                                                              219/117.1
2009/0065484 A1* 3/2009 Wang ................... B23K 11/115
                                                              219/118

* cited by examiner

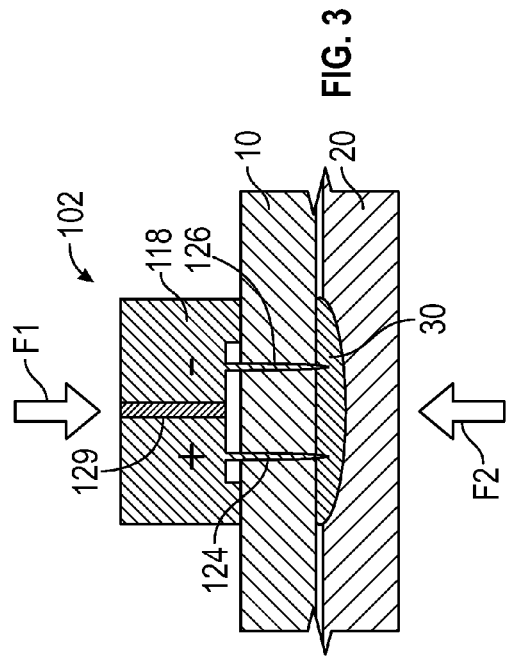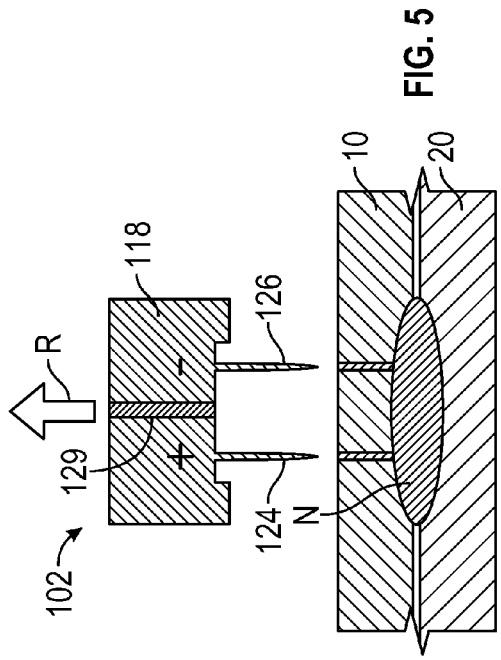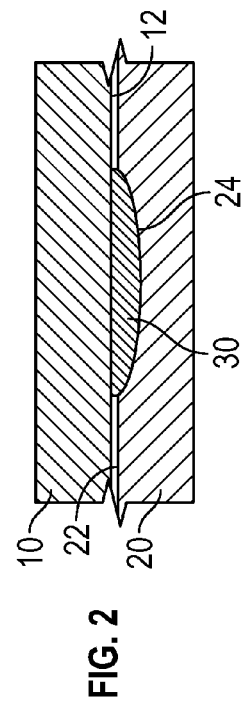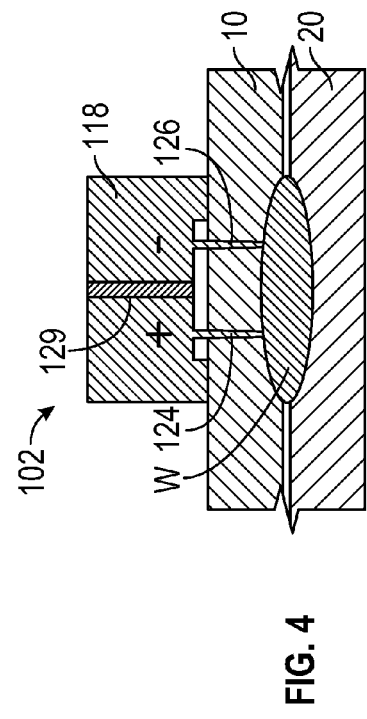
FIG. 2
FIG. 3
FIG. 4
FIG. 5

RESISTANCE SPOT WELDING SYSTEM AND METHOD

CROSS-REFERENCE TO RELATED APPLICATIONS

This application claims priority to and the benefit of U.S. Provisional Patent Application No. 61/983,656, filed on Apr. 24, 2014, which is hereby incorporated by reference in its entirety.

TECHNICAL FIELD

The present disclosure relates to a resistance spot welding system and method.

BACKGROUND

Welding is a process for joining two or more workpieces, such as metal substrates. In general, welding may include the application of heat and pressure to at least two workpieces in order to coalesce the workpieces. Numerous welding processes have been developed over the years.

SUMMARY

Resistance spot welding is a type of welding process in which electric current is passed through two electrodes and the workpieces to generate localized heating in the workpieces. The material forming the workpieces melts and coalesces at the interface between the two workpieces, thereby forming a weld pool. The weld pool then cools down to form a weld nugget. It is useful to minimize the time it takes to complete a resistance spot welding process and to maximize the strength and quality of the weld junction formed using the resistance spot welding process. To this end, the presently disclosed resistance spot welding system and method have been developed.

The presently disclosed resistance spot welding system can be used to join two or more polymeric workpieces. In an embodiment, the resistance spot welding system includes a power supply configured to supply electrical energy. The power supply has a positive terminal and a negative terminal. The resistance spot welding system further includes a welding electrode assembly electrically connected to the power supply. The welding electrode assembly includes a housing, a first electrically conductive pin, and a second electrically conductive pin. The first and second electrically conductive pins both protrude from the housing. The first electrically conductive pin is electrically connected to the positive terminal of the power supply, and the second electrically conductive pin is electrically connected to the negative terminal of the power supply. The second electrically conductive material is electrically insulated from the first electrically conductive pin and the both pins are electrically insulated from the housing. The first and second electrically conductive pins are at least partly made of a material having a hardness ranging between 50 HRC and 70 HRC in the Rockwell C scale. The present disclosure also relates just the welding electrode assembly. In addition, the present disclosure relates to a resistance spot welding method. The resistance spot welding method includes at least the following steps: (a) placing an electrically conductive coating between a first polymeric workpiece and a second polymeric workpiece; (b) piercing the first polymeric workpiece with the first and second electrically conductive pins of a welding electrode assembly; and (c) applying electrical energy to the first and second electrically conductive pins so that an electrical current flows through the first electrically conductive pin, the coating, and the second electrically conductive pin in order to melt at least partially the first polymeric workpiece, the second polymeric workpiece and the coating, thereby forming a weld pool at the faying interfaces.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a schematic, front sectional view of two polymeric workpieces and coating between the two polymeric workpieces;

FIG. 3 is a schematic, front sectional view of two polymeric workpieces, the coating shown in FIG. 2, and a welding electrode assembly applying a clamping force to the polymeric workpieces;

FIG. 4 is a schematic, front sectional view of the two polymeric workpieces, the coating, and the welding electrode assembly shown in FIG. 3, wherein the welding electrode assembly is applying electrical energy to the coating;

FIG. 5 is a schematic, front sectional view of the two polymeric workpieces, the coating, and the welding electrode assembly shown in FIG. 4, wherein the welding electrode assembly is withdrawn from the workpieces;

FIG. 6 is a cross-sectional view of an insert and a weld pool.

DETAILED DESCRIPTION

Figure 1:
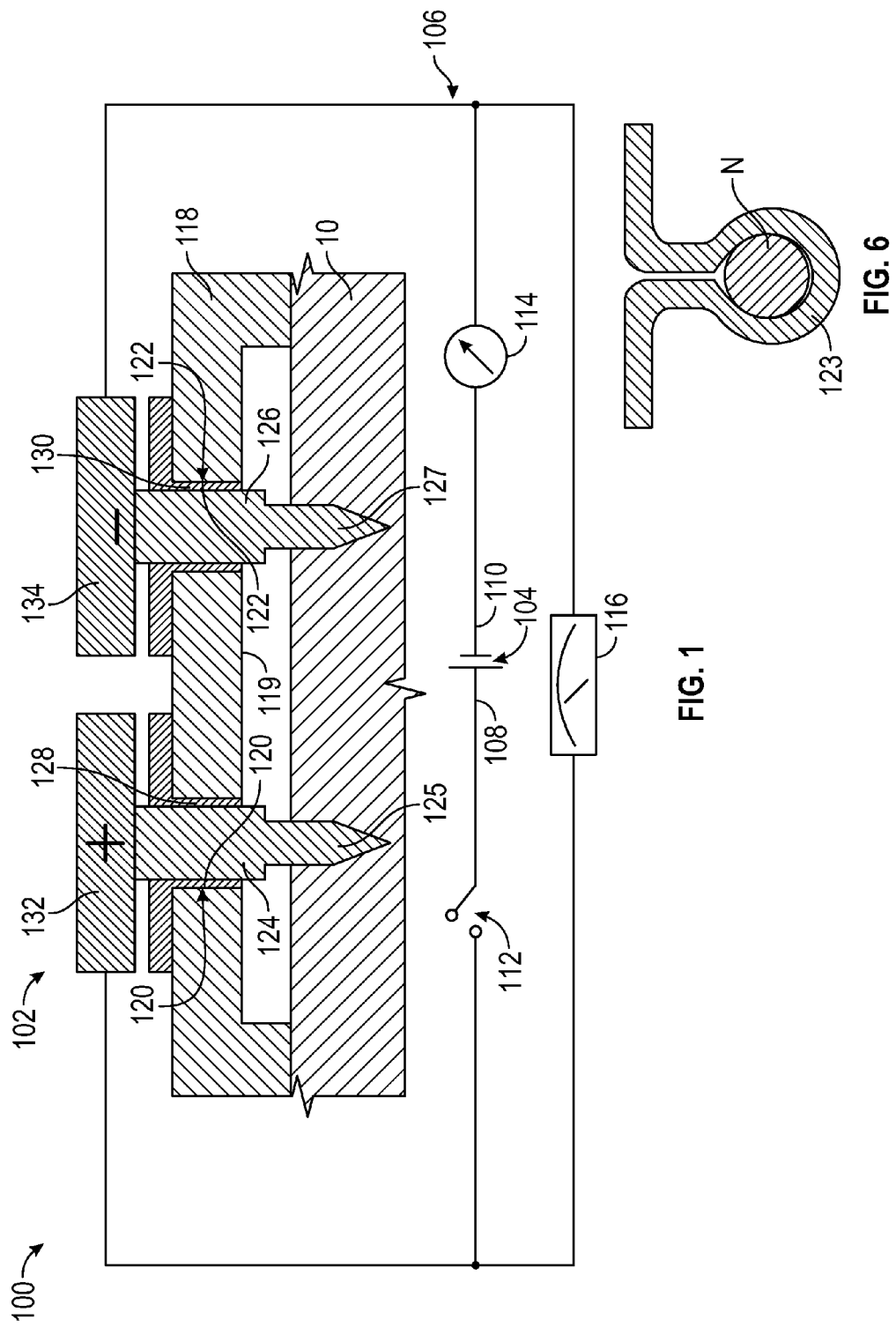
FIG. 1 is a schematic, front sectional view of a welding system.

Referring to the drawings, wherein like reference numbers refer to like components, FIG. 1 schematically illustrates a resistance spot welding system 100 for joining two or more polymeric workpieces. In the depicted embodiment, the welding system 100 can be used to join a first polymeric workpiece 10 and a second polymeric workpiece 20 (FIG. 3). The first and second polymeric workpieces 10, 20 (FIG. 3) are wholly or partly made of a suitable polymeric composite, such as a fiber-reinforced polymer. As non-limiting examples, suitable polymeric composites include thermoplastic composites having a matrix made of polymethyl methacrylate, polybenzimidazole, polyethylene, polypropylene, polyvinyl chloride, polytetrafluoroethylene, among others. The first and second polymeric workpieces 10, 20 (FIG. 3) can also be wholly or partly made of carbon fiber reinforced nylon compounds. The polymeric composite forming the first and second polymeric workpieces 10, 20 has a melting point ranging from 120 degrees Celsius to 600 degrees Celsius. For example, the polymeric composite forming the first and second polymeric workpieces 10, 20 may have a melting point of about 270 degrees Celsius.

The welding system 100 can be used in a resistive spot welding process. In resistance spot welding, electric current is passed through two electrodes and the workpieces to generate localized heating in the workpieces. The material forming the workpieces melts and coalesces at the interface between the two workpieces, thereby forming a weld pool. The weld pool then cools down to form a weld nugget that joins the two workpieces together.

With continued reference to FIG. 1, the welding system 100 includes a resistance spot welding electrode assembly 102 electrically connected to a power supply 104, such as a direct current (DC) or alternating current (AC) power. The welding electrode assembly 102 and the power supply 104 are part of an electrical circuit 106. The power supply 104 includes a positive terminal 108 and a negative terminal 110 and is configured to supply electrical energy to the welding electrode assembly 102. In other words, the power supply 104 can supply an electric current to the welding electrode assembly 102.

In addition to the power supply 104, the electrical circuit 106 includes an electrical switch 112 electrically connected to the power supply 104 in series. The electrical switch 112 can shift between an ON state (or position) and an OFF state (or position). In the ON state, the electrical switch 112 allows electric current to flow through the electrical circuit 106. As such, the electric current can flow from the power supply 104 to the welding electrode assembly 102 when the electrical switch 112 is in the ON state. Conversely, the electrical switch 112 interrupts the flow of electric current from the power supply 104 when it is in the OFF state. Thus, in the OFF state, the electrical switch 112 breaks the electric circuit 106 and, therefore, electric current cannot flow from the power supply 104 to the welding electrode assembly 102. The welding system 100 may further include a transformer to change the low current in the primary loop to high current in the secondary loop.

The welding system 100 additionally includes an ammeter 114 electrically connected to the power supply 104 in series. The ammeter 114 can measure the electric current in the electrical circuit 106. It is contemplated that the ammeter 114 may be a moving coil ammeter, an electrodynamic ammeter, a moving iron ammeter, a hot wire ammeter, a digital ammeter, an integrating ammeter or any other type of ammeter suitable to measure the electric current in the electric circuit 106.

The welding system 100 further includes a timer 116 for measuring time intervals. In the depicted embodiment, the timer 116 is electrically connected to the power supply 104 in parallel. The timer 116 can be used to measure and monitor the time that power supply 104 is supplying electrical current to the welding electrode assembly 102.

Referring to FIGS. 1 and 3, the welding electrode assembly 102 is electrically connected to the power supply 104 and includes a housing 118. The housing 118 defines first and second openings 120, 122 (FIG. 1), which are spaced apart from each other. As non-limiting examples, the first and second openings 120, 122 may be holes or bores and are substantially parallel to each other. The housing 118 also defines a housing cavity 119.

The welding electrode assembly 102 further includes first and second electrically conductive pins 124, 126 protruding from the housing 118. The first and second electrically conductive pins 124, 126 may be referred to as first and second electrodes, respectively, and each is at least partially disposed inside the housing 118. In the depicted embodiment, the first electrically conductive pin 124 is partially disposed in the first opening 120, and the second electrically conductive pin 126 is partially disposed in the second opening 122. In other words, the first opening 120 partially receives the first electrically conductive pin 124, and the second opening 122 partially receives the second electrically conductive pin 126. The first and second openings 120, 122 are in communication with the housing cavity 119, and the housing cavity 119 partially receives the first and second electrically conductive pins 124, 126. The first and second openings 120, 122 are arranged side-by-side and parallel to each other. Accordingly, the first and second electrically conductive pins 124, 126 are also arranged side-by-side and parallel to each other.

The first and second electrically conductive pins 124, 126 are wholly or partly made of an electrically conductive material, such as a metal, that has a hardness ranging between 50 HRC and 70 HRC in the Rockwell C scale. As a non-limiting example, the harness of the material forming the first and second electrically conductive pins 124, 126 is about 65 HRC in the Rockwell C scale. It is useful that the first and second electrically conductive pins 124, 126 are at least partly made of a material with the hardness and hardness range as described above so that the first and second electrically conductive pins 124, 126 can pierce the first and second polymeric workpieces 10, 20 (FIG. 3). The first and second polymeric workpieces 10, 20 have a hardness ranging between 10 HRC and 50 HRC in the Rockwell C scale in order to allow the first and second electrically conductive pins 124, 126 (with the hardness described above) to pierce the first and second polymeric workpieces 10, 20. As a non-limiting example, the first and second electrically conductive pins 124, 126 may be wholly or partly made of steel. For example, each of the first and second electrically conductive pins 124, 126 may be wholly or partly made of high-speed steel T1, high-speed steel M2, and, H-13 tool steel. Further, the first and second electrically conductive pins 124, 126 may be wholly or partly made of copper alloy, tungsten carbide or cobalt alloy steel, tungsten or molybdenum based alloy. If the first and second electrically conductive pins 124, 126 are made of steel, the first and second electrically conductive pins 124, 126 can be brazed with a copper alloy to dissipate the heat from the first and second electrically conductive pins 124, 126.

To facilitate piercing the first polymer workpiece 10, each of the first and second electrically conductive pins 124, 126 includes a tapered or pointed tip 125, 127, respectively. The tapered tips 125, 127 may also define a groove to facilitate piercing the first polymeric workpiece 10.

The second electrically conductive pin 126 is electrically insulated from the first electrically conductive pin 124. As such, electric current cannot directly flow from the first electrically conductive pin 124 to the second electrically conductive pin 126. To electrically insulate the first and second electrically conductive pins 124, 126 from each other, the welding electrode assembly 102 includes a first electrically insulating cover 128 and a second electrically insulating cover 130. The first and second electrically insulating covers 128, 130 are wholly or partly made of an electrically insulating material, such as a polymer. The first electrically insulating cover 128 is partially disposed in the first opening 120 and at least partially surrounds the first electrically conductive pin 124. Accordingly, the first opening 120 partially receives the first electrically insulating cover 128 and the first electrically conductive pin 124. The second electrically insulating cover 130 is partially disposed in the second opening 122 and at least partially surrounds the second electrically conductive pin 126. Therefore, the second opening 122 partially receives the second electrically insulating cover 130 and the second electrically conductive pin 126. Alternatively or in addition to the first and second electrically insulating covers 128, 130, the welding electrode assembly 102 may include an electrical insulator 129 (FIG. 3) in order to electrically separate the first electrically conductive pin 124 from the second electrically conductive pin 126.

The welding electrode assembly 102 includes a first electrically conductive connector 132 electrically connecting the first electrically conductive pin 124 to the positive terminal 108 of the power supply 104. The electrical switch 112 is electrically connected in series between the positive terminal 108 of the power supply 104 and the first electrically conductive pin 124. Further, the welding electrode assembly 102 includes a second electrically conductive connector 134 electrically connecting the second electrically conductive pin 126 to the negative terminal 110 of the power supply 104. The ammeter 114 is electrically connected in series between the negative terminal 110 of the power supply 104 and the second electrically conductive connector 134.

FIGS. 2-5 schematically illustrate a resistance spot welding method using the welding system 100 described above. First, in FIG. 2, the method begins by placing a coating 30 between the first and second polymeric workpieces 10, 20. In other words, the coating 30 is placed at the interface between the first and second polymeric workpieces 10, 20 (i.e., the weld interface). No other heating element needs to be placed at the weld interface. The coating 30 is wholly or partly made of an electrically and thermally conductive material. As a non-limiting example, the coating 30 may be carbon black or a thermoplastic material. For example, the coating 30 may be 839 graphite conductive coating, 838 total ground carbon conductive coating, or 843 silver coated copper conductive coating. The second workpiece 20 may include a workpiece cavity 24 configured, shaped, and sized to at least partially receive the coating 30. In addition, the first polymeric workpiece 10 defines a first faying surface 12, and the second workpiece 20 defines a second faying surface 22. In the step illustrated in FIG. 2, the coating 30 may first be placed in the workpiece cavity 24 or on the second faying surface 22. Then, the first polymeric workpiece is placed on top of the coating 30 and the second polymeric workpiece 20 such that the first faying surface 12 faces the second faying surface 22. Then, the method continues to the step illustrated in FIG. 3.

FIG. 3 illustrates a step in which the welding electrode assembly 102 is advanced toward the first polymeric workpiece 10 such that the first and second electrically conductive pins 124, 126 pierce the first polymeric workpiece 10. In other words, the step illustrated in FIG. 3 entails piercing the first polymeric workpiece 10 with the first and second electrically conductive pins 124, 126. Once the first and second electrically conductive pins 124, 126 pierce the first polymeric workpiece 10, the welding electrode assembly 102 is advanced in the direction indicated by arrow F1 in order to advance the first and second electrically conductive pins 124, 126 through the first polymeric workpiece 10. The first and second electrically conductive pins 124, 126 are advanced simultaneously through the first polymeric workpiece 10 in the direction indicated by arrow F1 until the first and second electrically conductive pins 124, 126 contact the coating 30 disposed between the first and second polymeric workpieces 10, 20. Alternatively, the first and second workpieces 10, 20 can be advanced simultaneously through the first workpiece 10 and toward the second workpiece 20 until the first and second workpieces 10, 20 partially penetrate the second workpiece 20. Thus, the step illustrated in FIG. 3 entails advancing the first and second electrically conductive pins 124, 126 through the first polymeric workpiece 10 until the first and second electrically conductive pins 124, 126 contact the coating 30 disposed between the first polymeric workpiece 10 and the second polymeric workpiece 20.

With reference to FIG. 6, for insert design, the geometry of the coating or inert 123 plays an important role. The shape should provide uniform heat around the welding nugget N as shown in FIG. 6. For example, the insert 123 may have a substantially cylindrical shape in order to provide uniform heat around the welding nugget N.

The step shown in FIG. 3 also entails applying pressure (by applying a clamping force in the directions indicated by arrows F1 and F2) to the first polymeric workpiece 10 in order to press the first polymeric workpiece 10 against the coating 30 and the second polymeric workpiece 20. To do so, the welding electrode system 102 is advanced toward the first polymeric workpiece 10 and the coating 30 in the direction indicated by arrow F1 until the housing 118 contacts the first polymeric workpiece 10. Once the housing 118 contacts the first polymeric workpiece 10, the welding electrode assembly 102 is continuously advanced in the direction indicated by arrow F1 in order to press the first polymeric workpiece 10 against the coating 30 and the second polymeric workpiece 20. Thus, the welding electrode assembly 102 exerts pressure against the first polymeric workpiece 10 in order to press the first and second polymeric workpieces 10, 20 together. Because the welding electrode assembly 102 serves to exert pressure on the first and second polymeric workpieces 10, 20 and to conduct an electric current at the interface between the first and second polymeric workpieces 10, 20, the welding electrode assembly 102 may be referred to as a hybrid welding electrode assembly.

Although the first and second electrically conductive pins 124, 126 advance simultaneously through the first polymeric workpiece 10 when pressured is applied to the first polymeric workpiece 10, the first and second electrically conductive pins 124, 126 may partially pierce the second polymeric workpiece 20. The first and second electrically conductive pins 124, 126 may be advanced through the first polymeric workpiece 10 in the direction indicated by arrow F1 until the first and second electrically conductive pins 124, 126 contact the coating 30 and partially penetrate second polymeric workpiece 20.

As shown in FIG. 4, once the first and second electrically conductive pins 124, 126 are in contact with the coating 30, electrical energy is applied to the first and second electrically conductive pins 124, 126 so that electrical current (from the power supply 104) flows first to the first electrically conductive pin 124, then through the coating 30, and next through the second electrically conductive pin 126. The power supply 104 supplies electrical energy to the coating 30 (via the first and second electrically conductive pins 124, 126) with sufficient electric current and for enough time. The heat resulting from the resistances of the coating 30 and pins to the current softens or melts the materials around the pins 124 and 126, and melts the coating 30 and at least part of the first and second polymeric workpieces 10, 20, thereby forming a weld pool W at the faying interfaces. As discussed above, the first and second polymeric workpieces 10, 20 are made of a material having a melting point of about 270 degrees Celsius. Thus, a sufficiently high electric current is passed through the coating or insert 123 for a sufficient amount of time in order to heat the first polymeric workpiece 10, the second polymeric workpiece 20, and the coating or insert 123 at a temperature that is greater than 270 degrees Celsius. Also, a material for the coating 30 that has enough resistivity may be selected in order to reduce the cycle time. During this heating process, the coating or insert 123 may melt and portions of the first and second polymeric workpieces 10, 20 surrounding the coating or insert 123 may melt to form the weld nugget N. To avoid any electrical shock, the welding schedule should avoid initial electrical current shock and utilize resistance steady duration to form the bonding nugget.

As shown in FIG. 5, after forming the weld pool W, the first and second electrically conductive pins 124, 126 are withdrawn from the first polymeric workpiece 10. It may be useful to wait for a predetermined period of time before retrieving the first and second electrically conductive pins 124, 126 in order to make sure that the first and second workpieces 10, 20 are held by the molten nugget. To do so, the welding electrode assembly 102 is moved away from the first polymeric workpiece 10 in the direction indicated by arrow R. The weld pool W is then cooled in order to form a weld nugget N that joins the first and second polymeric workpieces 10, 20. In other words, the step shown in FIG. 5 entails cooling the weld pool W until the weld pool W solidifies and forms the weld nugget N. The cooling may be through natural conduction. That is, the weld pool W may be allowed to cool down. Regardless of the cooling method, once the weld pool W cools down, it forms a weld nugget N that joins the first and second polymeric workpieces 10, 20. Since the polymer of the first and second workpieces 10, 20 has a relatively low thermal conductivity, the cavities left in the first and second workpieces 10, 20 after removing the first and second electrically conductive pins 124, 126 will likely be partially filled by the surrounding viscous polymer.

While the best modes for carrying out the invention have been described in detail, those familiar with the art to which this invention relates will recognize various alternative designs and embodiments for practicing the invention within the scope of the appended claims.

The invention claimed is:

1. A resistance spot welding method, comprising:
   placing a conductive coating between a first polymeric workpiece and a second polymeric workpiece;
   piercing the first polymeric workpiece with first and second electrically conductive pins of a welding electrode assembly; and
   applying electrical energy to the first and second electrically conductive pins so that an electrical current flows through the first electrically conductive pin, the conductive coating, and the second electrically conductive pin in order to at least partially melt the first polymeric workpiece, the second polymeric workpiece and the conductive coating, thereby forming a weld pool.

2. The resistance spot welding method of claim 1, further comprising applying a clamping force to the first and second polymeric workpieces in order to press the first polymeric workpiece against the conductive coating and the second polymeric workpiece.

3. The resistance spot welding method of claim 1, further comprising advancing the first and second electrically conductive pins through the first polymeric workpiece until the first and second electrically conductive pins partially penetrate the second polymeric workpiece.

4. The resistance spot welding method of claim 1, further comprising withdrawing the first and second electrically conductive pins from the first polymeric workpiece after forming the weld pool.

5. The resistance spot welding method of claim 1, further comprising cooling the weld pool until the weld pool solidifies.

6. The resistance spot welding method of claim 1, wherein each of the first and second polymeric workpieces has a melting point of about 270 degrees Celsius, and applying electrical energy to the first and second electrically conductive pins includes supplying sufficient electric current to the conductive coating for a sufficient amount of time in order to heat the first polymeric workpiece, the second polymeric workpiece, and the conductive coating at a temperature that is greater than 270 degrees Celsius.

7. The resistance spot welding method of claim 1, wherein the conductive coating is made of an electrically and thermally conductive material.

8. The resistance spot welding method of claim 1, further comprising:
   applying a clamping force to the first and second polymeric workpieces in order to press the first polymeric workpiece and the second polymeric workpiece against the conductive coating;
   advancing the first and second electrically conductive pins through the first polymeric workpiece until the first and second electrically conductive pins partially penetrate the second polymeric workpiece;
   withdrawing the first and second electrically conductive pins from the first polymeric workpiece after forming the weld pool; and
   cooling the weld pool until the weld pool solidifies;
   wherein each of the first and second polymeric workpieces has a melting point of about 270 degrees Celsius, and applying electrical energy to the first and second electrically conductive pins includes supplying an electric current to the conductive coating for an amount of time to sufficiently heat the first polymeric workpiece, the second polymeric workpiece, and the conductive coating at a temperature that is greater than 270 degrees Celsius; and
   the conductive coating is made of an electrically and thermally conductive material;
   wherein the first and second electrically conductive pins are advanced simultaneously through the first polymeric workpiece between the first and second polymeric workpieces;
   wherein the resistance spot welding method is performed with a resistance spot welding electrode system, wherein the resistance spot welding electrode system comprises:
      a power supply configured to supply the electrical energy, wherein the power supply has a positive terminal and a negative terminal;
      a welding electrode assembly electrically connected to the power supply, wherein the welding electrode assembly includes:
         a housing;
         the first electrically conductive pin protruding from the housing, wherein the first electrically conductive pin is electrically connected to the positive terminal of the power supply;
         the second electrically conductive pin protruding from the housing, wherein the second electrically conductive pin is electrically connected to the negative terminal of the power supply and is electrically insulated from the first electrically conductive pin;
         a first electrically insulating cover at least partially surrounding the first electrically conductive pin;
         a second electrically insulating cover at least partially surrounding the second electrically conductive pin;
         an electrical switch electrically connected in series between the positive terminal of the power supply and the first electrically conductive pin;

an ammeter electrically connected to the power supply, wherein the ammeter is configured to measure electric current;
a timer electrically connected to the power supply, wherein the timer is configured to measure a time that the power supply is supplying electrical current to the welding electrode assembly;
wherein the first and second electrically conductive pins are at least partly made of a material having a hardness ranging between 50 HRC and 70 HRC;
wherein each of the first and second electrically conductive pins has a tapered tip;
wherein the housing defines first and second openings receiving the first and second electrically conductive pins, respectively;
an ammeter electrically connected to the power supply, wherein the ammeter is configured to measure electric current
wherein the first opening at least partially receives the first electrically insulating cover and the first electrically conductive pin;
wherein the second opening at least partially receives the second electrically insulating cover and the second electrically conductive pin;
wherein the conductive coating is placed at an interface between the first and second polymeric workpieces, the interface between the first polymeric workpiece and the second polymeric workpiece being a weld interface;
wherein the second polymeric workpiece includes a workpiece cavity configured, shaped, and sized to at least partially receive the conductive coating;
wherein the first polymeric workpiece defines a first faying surface, and the second polymeric workpiece defines a second faying surface;
wherein placing the conductive coating between the first polymeric workpiece and the second polymeric workpiece includes first placing the conductive coating in the workpiece cavity and then placing the first polymeric workpiece on top of the conductive coating and the second polymeric workpiece such that the first faying surface faces the second faying surface; and
wherein each of the first electrically conductive pin and the second electrically conductive pin comprises steel.

\* \* \* \* \*